United States Patent
Meshberg

[19]

[11] Patent Number: 6,126,042
[45] Date of Patent: Oct. 3, 2000

[54] DISPENSER WITH INVERTED-DISPENSING FEATURE AND SNAP-ON MOUNTING CUP

[76] Inventor: Philip Meshberg, 2770 S. Ocean Blvd., Apartment 602, Palm Beach, Fla. 33480

[21] Appl. No.: 08/947,460

[22] Filed: Oct. 17, 1997

Related U.S. Application Data

[60] Continuation-in-part of application No. 08/774,338, Dec. 30, 1996, Pat. No. 5,875,932, which is a division of application No. 08/419,499, Apr. 10, 1995, Pat. No. 5,620,113, which is a continuation-in-part of application No. 08/305,637, Sep. 14, 1994, Pat. No. 5,667,104, which is a continuation-in-part of application No. 08/163,787, Dec. 9, 1993, Pat. No. 5,593,064, which is a continuation-in-part of application No. 08/222,975, Apr. 5, 1994, Pat. No. 5,460,207, which is a division of application No. 07/887,032, May 22, 1992, Pat. No. 5,305,810.

[51] Int. Cl.⁷ ..................................................... B67D 3/00
[52] U.S. Cl. ..................................... 222/321.4; 222/376
[58] Field of Search ............................. 222/321.4, 382, 222/464.1, 402.19, 376

[56] References Cited

U.S. PATENT DOCUMENTS

| | | | |
|---|---|---|---|
| 4,277,001 | 7/1981 | Nozawa | 222/321.4 |
| 5,222,636 | 6/1993 | Meuresch | 222/324.4 |
| 5,620,113 | 4/1997 | Meshberg | 222/321.4 X |

FOREIGN PATENT DOCUMENTS

| 39 29 064 | 1/1991 | Germany | 222/321.4 |
|---|---|---|---|

*Primary Examiner*—Kevin Shaver
*Assistant Examiner*—John Bastianelli
*Attorney, Agent, or Firm*—Kenyon & Kenyon

[57] ABSTRACT

A directional dispensing package which is easily shipped, filled and assembled is disclosed. The package includes a retaining opening into which a pump may be snap-fit by inserting the pump through an open end of the package. The package and pump can be assembled at a production site, and are thereafter shipped to a filling site with a bottom portion. The package can be filled through the open bottom end, and then the bottom portion sealingly affixed to the package. The package may include an integrally-molded dip tube structure, which can also serve as the pump housing. The dip tube structure may also be snapped into the package. The dip tube structures of the present invention allow easy assembly while preventing leakage. Various devices for allowing inverted dispensing are disclosed. The device of the present invention can be filled and finally assembled with a minimal number of steps, and is therefore particularly suited for quick-turnaround marketing.

10 Claims, 15 Drawing Sheets

DISPENSER WITH INVERTED-DISPENSING FEATURE AND SNAP-ON MOUNTING CUP

This application is a continuation-in-part of U.S. patent application Ser. No. 08/774,338, filed Dec. 30, 1996, now U.S. Pat. No. 5,875,932 which is a division of U.S. patent application Ser. No. 08/419,499, filed Apr. 10, 1995, now U.S. Pat. No. 5,620,113, issued Apr. 15, 1997 which is a continuation-in-part of Ser. No. 08/305,637 filed Sep. 14, 1994 now U.S. Pat. No. 5,667,104 which is a continuation-in-part of Ser. No. 08/163,787 filed Dec. 9, 1993 now U.S. Pat. No. 5,593,064 which is a continuation-in-part of Ser. No. 08/222,975 filed Apr. 5, 1994 now U.S. Pat. No. 5,460,207 which is a division of Ser. No. 07/887,032 filed May 22, 1992 now U.S. Pat. No. 5,305,810.

BACKGROUND OF THE INVENTION

1. Field of the Invention

The present invention relates to a complete dispensing package designed to be shipped as an assembled unit to a liquid product marketer, for subsequent filling. The dispensing package is easily filled and top or bottom sealed with a minimal number of automatic assembly steps. The package of the present invention also provides a tamper-resistant package. In one embodiment of the present invention, the dispensing package may include a modified bottom sealing mechanism adapted for easy assembly and effective sealing. The dispensing package may include in one embodiment a dip tube integral with the container portion, which allows for easy filling and assembly. In another embodiment, an integral or separable dip tube structure can serve as the pump housing. The present invention can also include various devices for allowing dispensing in an inverted position of the dispenser. An embodiment of the invention may also include a mounting cup for mounting the pump to the package, which may be a blow-molded package, without the need for screw threads or crimping.

2. Description of the Prior Art

U.S. Pat. No. 5,158,211 discloses a dispensing package including a modular pump which is assembled into a dispensing package using a snap fit, such that the dispensing pump is permanently retained in the package. In the device disclosed in U.S. Pat. No. 5,158,211, the package is filled through an opening at the top of the package. After filling, the pump is attached to the package, either by snap-fitting the pump structure into a retaining opening, or by adding the pump to the package using a conventional screw-cap mounting. Accordingly, in the device of U.S. Pat. No. 5,158,211, the assembled pump structure and the package must be shipped unassembled to a filling and assembly site, where the package is filled and the pump is then assembled to the package.

U.S. Pat. No. 5,305,810 describes a method and apparatus for filling a dispensing package with a highly viscous product. In the method of that patent, the package is filled through a dip tube structure which is inserted into the package prior to filling.

SUMMARY OF INVENTION

The present invention is a package-dispensing unit combination designed for easy filling and post-filling assembly, and which can be efficiently shipped to a liquid product producer and to a post-filling marketer. The device of the present invention is especially suitable for promotional purposes, since the liquid product producer need only fill the package and snap on a bottom piece or a mounting cup to the package, which may be labeled before or after the filling process. The device of the present invention is ideally suited for allowing directional dispensing of liquid products. The device is thus particularly suited to a quick-turnaround filling and marketing operation, and the assembled and filled packages can be shipped in the same cartons as the unfilled packages were shipped to the liquid product producer. Accordingly, the present invention eliminates waste in carton usage, preventing the need to use different cartons for the containers, pumps and the filled package.

The present invention includes an embodiment with a dip tube structure which is integrally molded with the package. This construction allows easy assembly and filling of the package, particularly filling the package through the dip tube. As a result, the product is especially useful in dispensing highly viscous products. The integral dip tube structure can be used as a housing for an inverted-dispensing apparatus, or as the housing for the pump. As an alternative, a separable dip tube structure can be used as the pump housing.

In another embodiment of the present invention, a mounting cup is used to secure the pump to the package, and the mounting cup is structured to snap onto the neck of the package which package may be blow-molded. This design obviates the need for either a screw-threaded mounting cup for mounting the pump to the package, or the use of conventional crimping techniques. The mounting cup of the present invention may be easily snapped on, while still providing effective sealing of the contents within the package.

The device of the present invention can include several different designs of an element for allowing inverted dispensing from the package. The inverted dispensing device can be adapted to a dip tube which is integral with the package bottom, or a dip tube which is integral with the package. Additionally, the inverted dispensing device can be contained within the integral dip tube structure.

BRIEF DESCRIPTION OF THE DRAWINGS

Other objects and advantages of the invention will be apparent from the specification and claims, when considered in connection with the attached sheets of drawings, illustrating one form of the invention, wherein like characters represent like parts and in which:

DETAILED DESCRIPTION OF THE DRAWINGS

Figure 1:
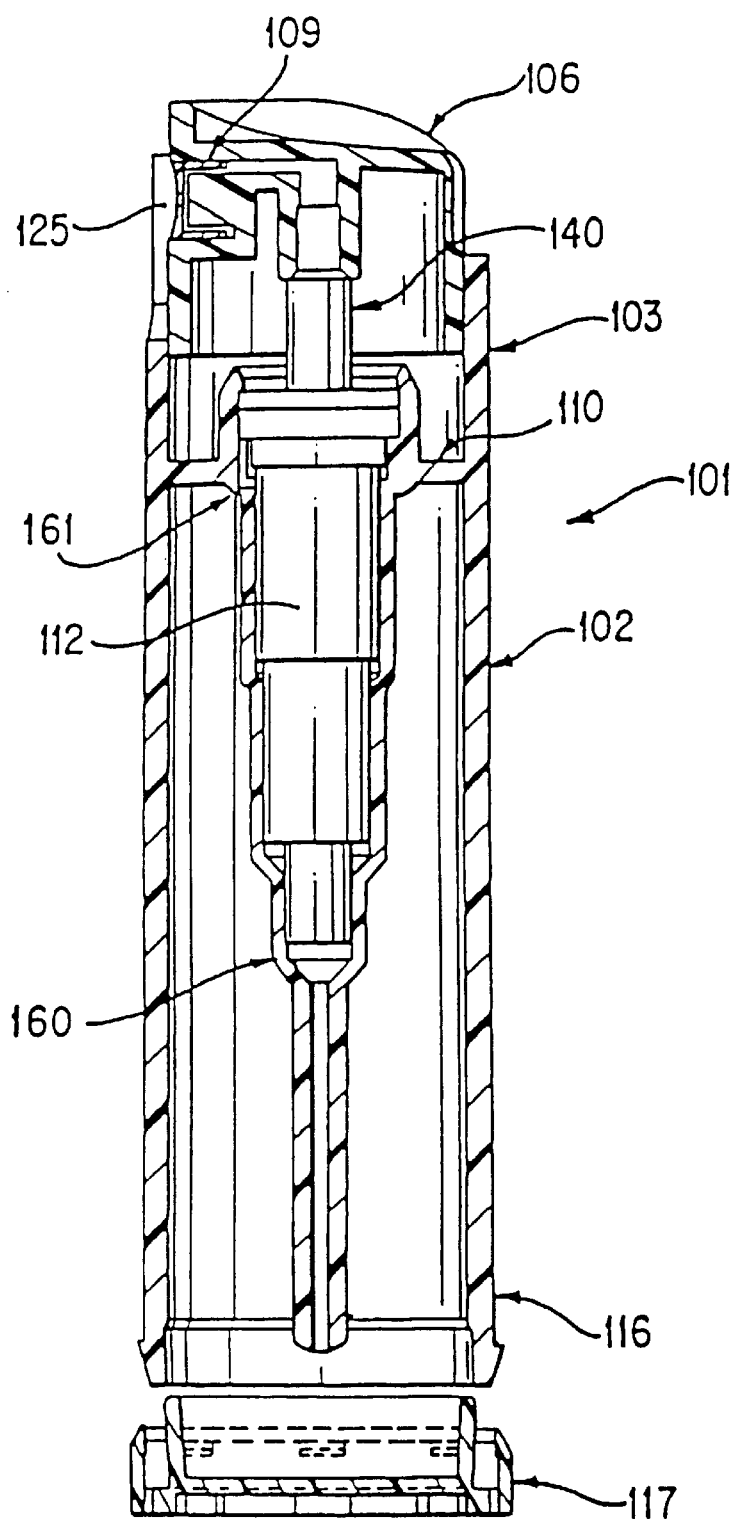
FIG. 1 is a cross-sectional view of an embodiment of the dispensing package of the present invention in which the dispensing package includes an integrally-molded dip tube structure and a snap-on bottom.
Figure 2:
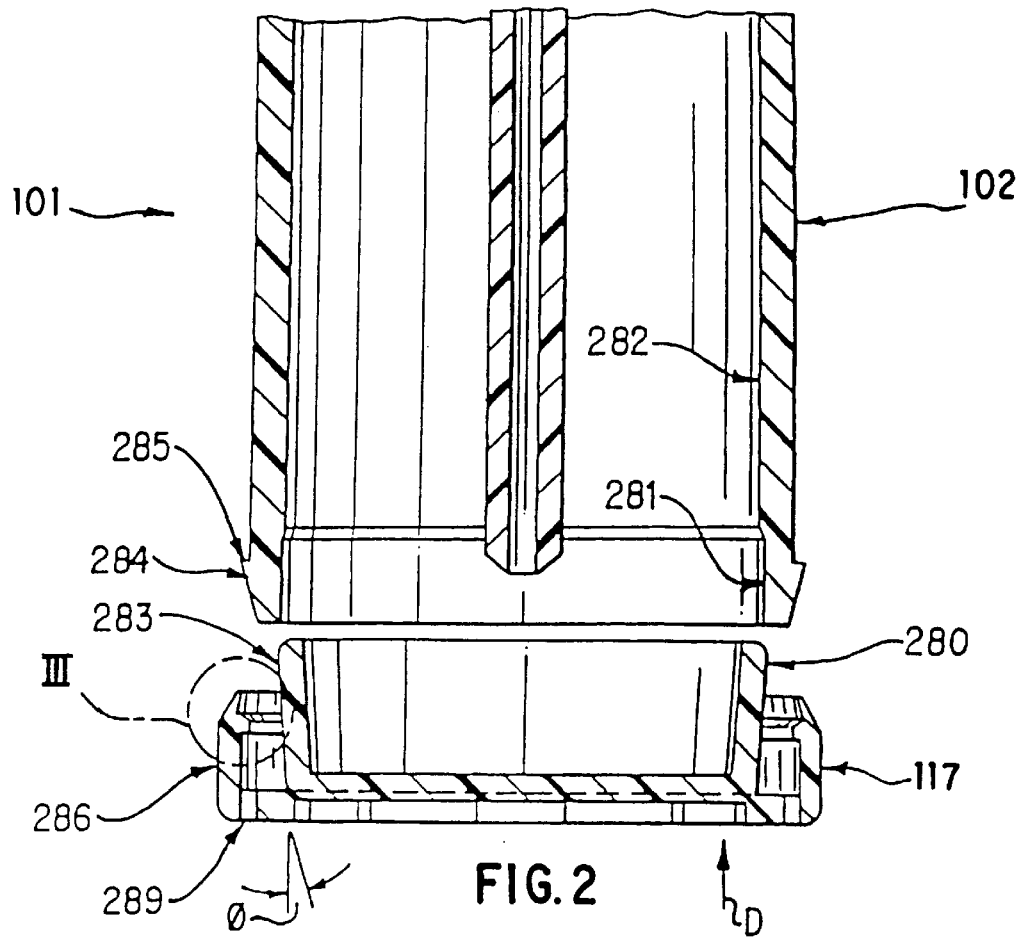
FIG. 2 is a cross-sectional detail view of the bottom of the embodiment of FIG. 1, in an unassembled exploded view.
Figure 3:
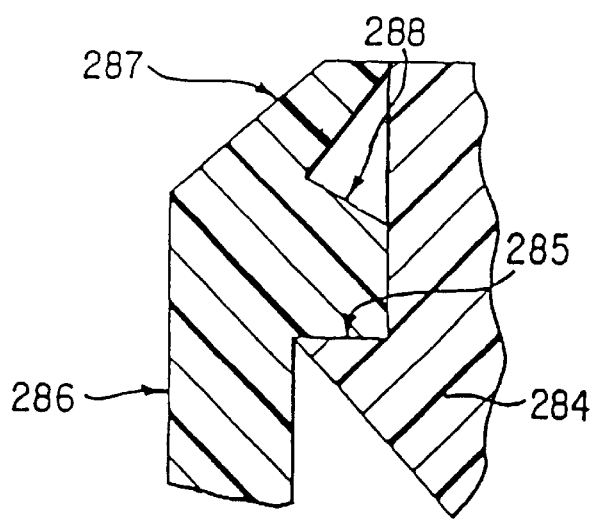
FIG. 3 is a detail cross-sectional view of the rim seal of the bottom portion of the dispensing package of the embodiment of FIG. 2.
Figure 4:
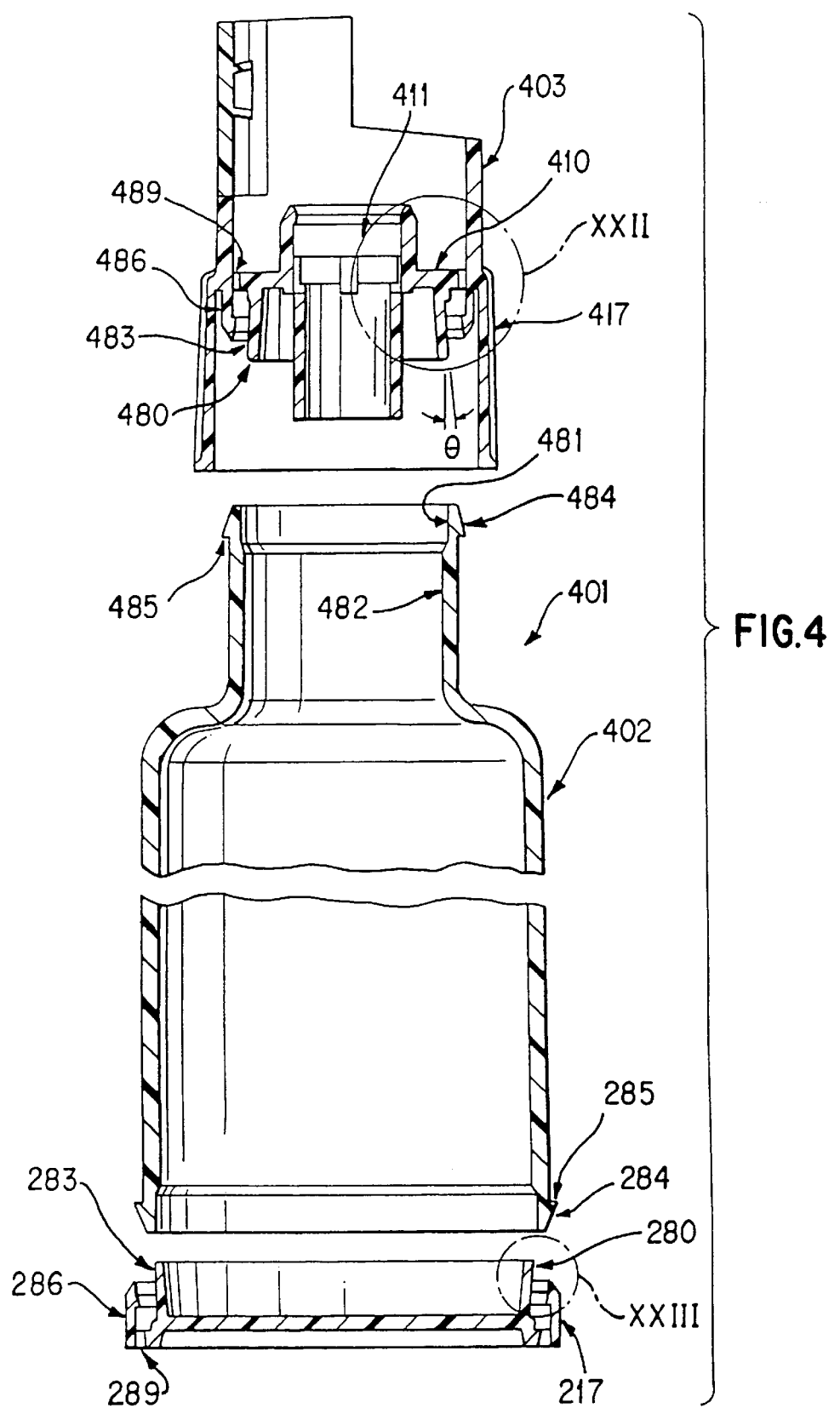
FIG. 4 is an exploded, cross-sectional view of a second embodiment of the dispensing package of the present invention.
Figure 5:
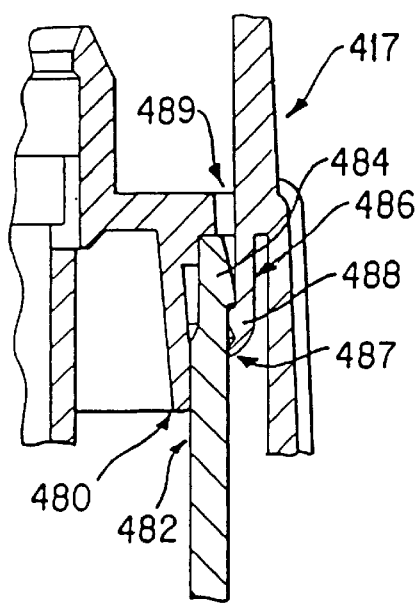
FIG. 5 is a detail, cross-sectional view of the connection between the mounting cup and the package of the embodiment of FIG. 4.
Figure 6:
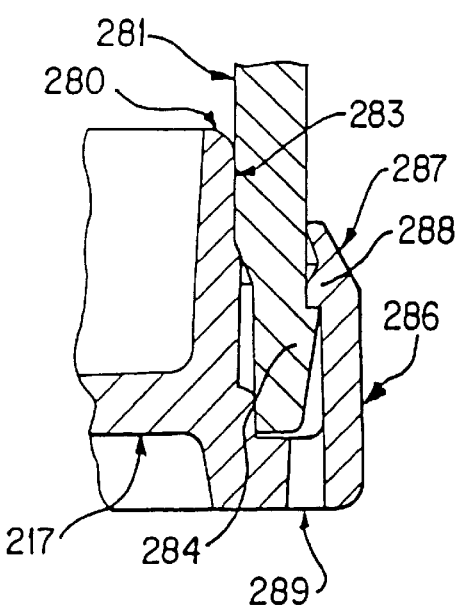
FIG. 6 is a detail, cross-sectional view of the connection between the bottom and the package of the embodiment of FIG. 4.
Figure 7:
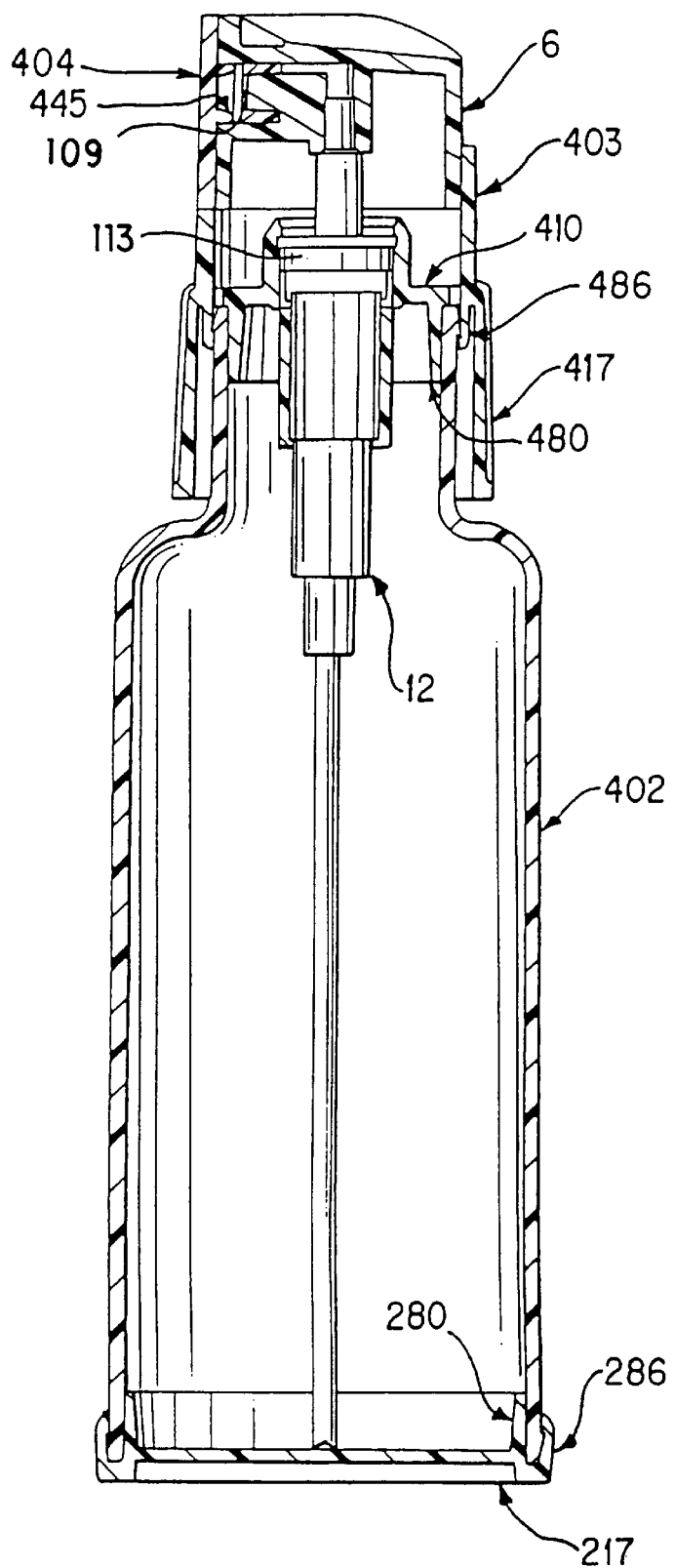
FIG. 7 is a cross-sectional view of an assembled package according to the embodiment of FIG. 4.
Figure 8:
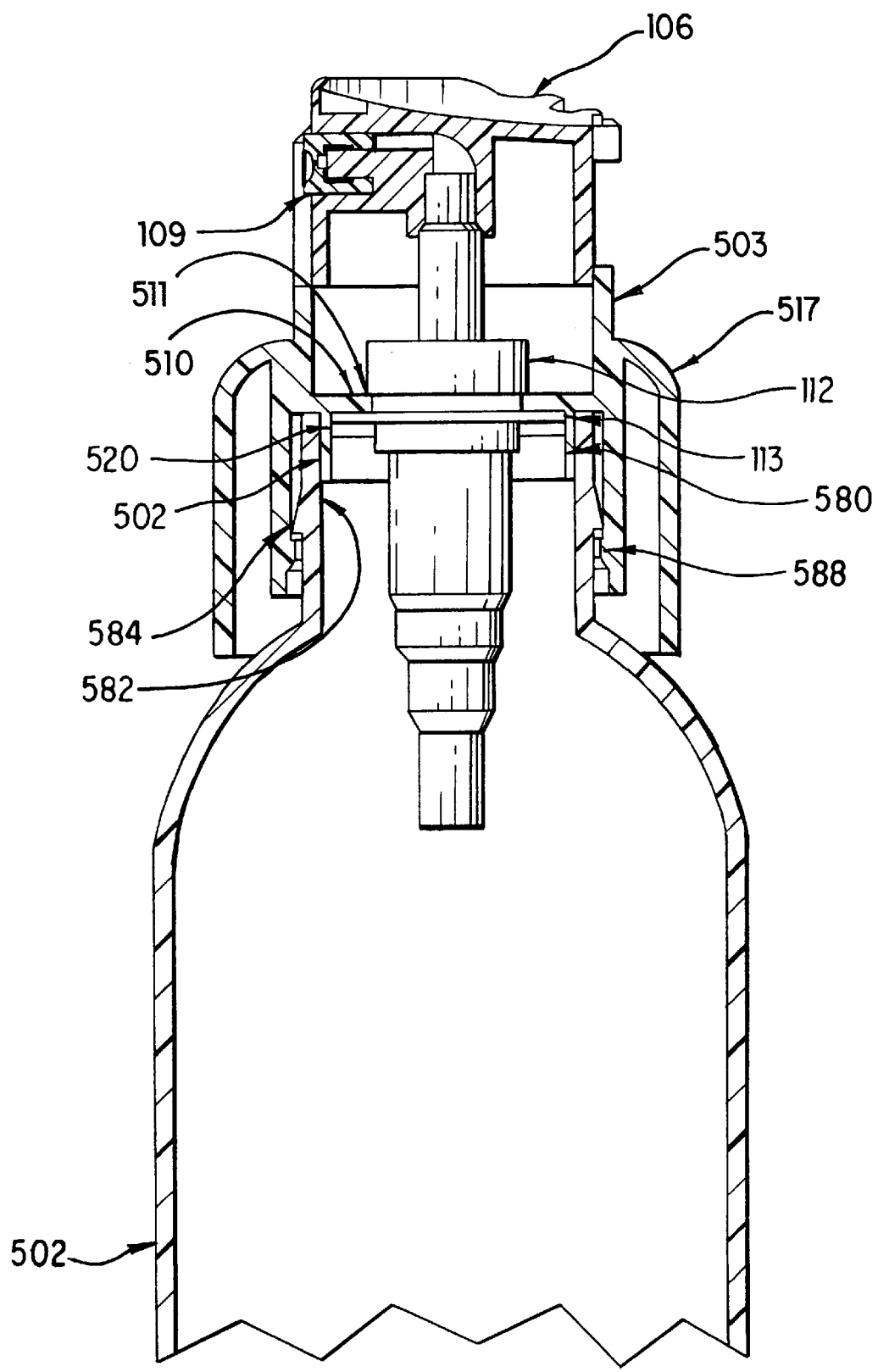
FIG. 8 is a partial cross-sectional view of a third embodiment of a dispensing package of the present invention.
Figure 9:
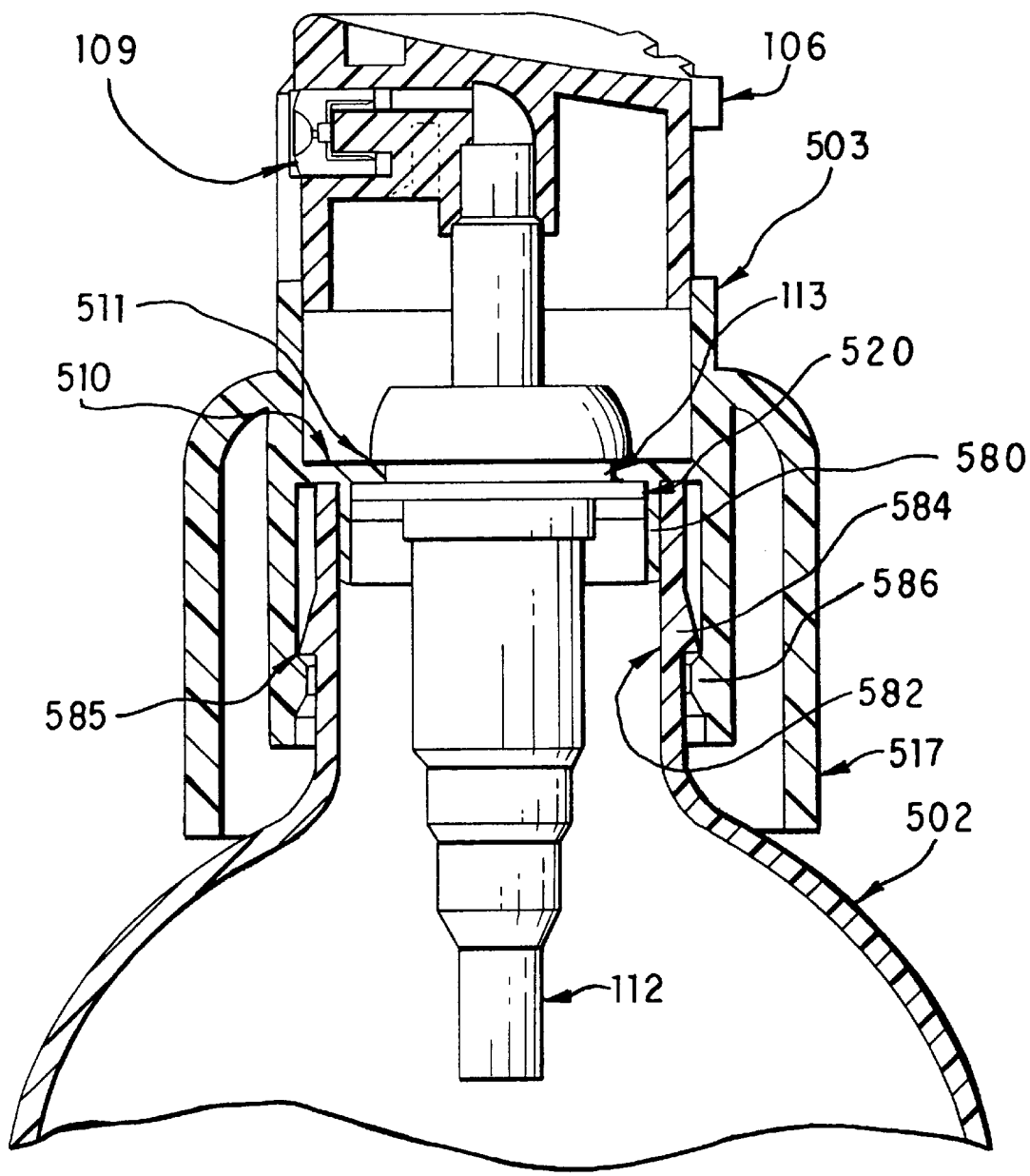
FIG. 9 is a partial cross-sectional detail view of the embodiment of FIG. 8.
Figures 10, 11, 12, 13:
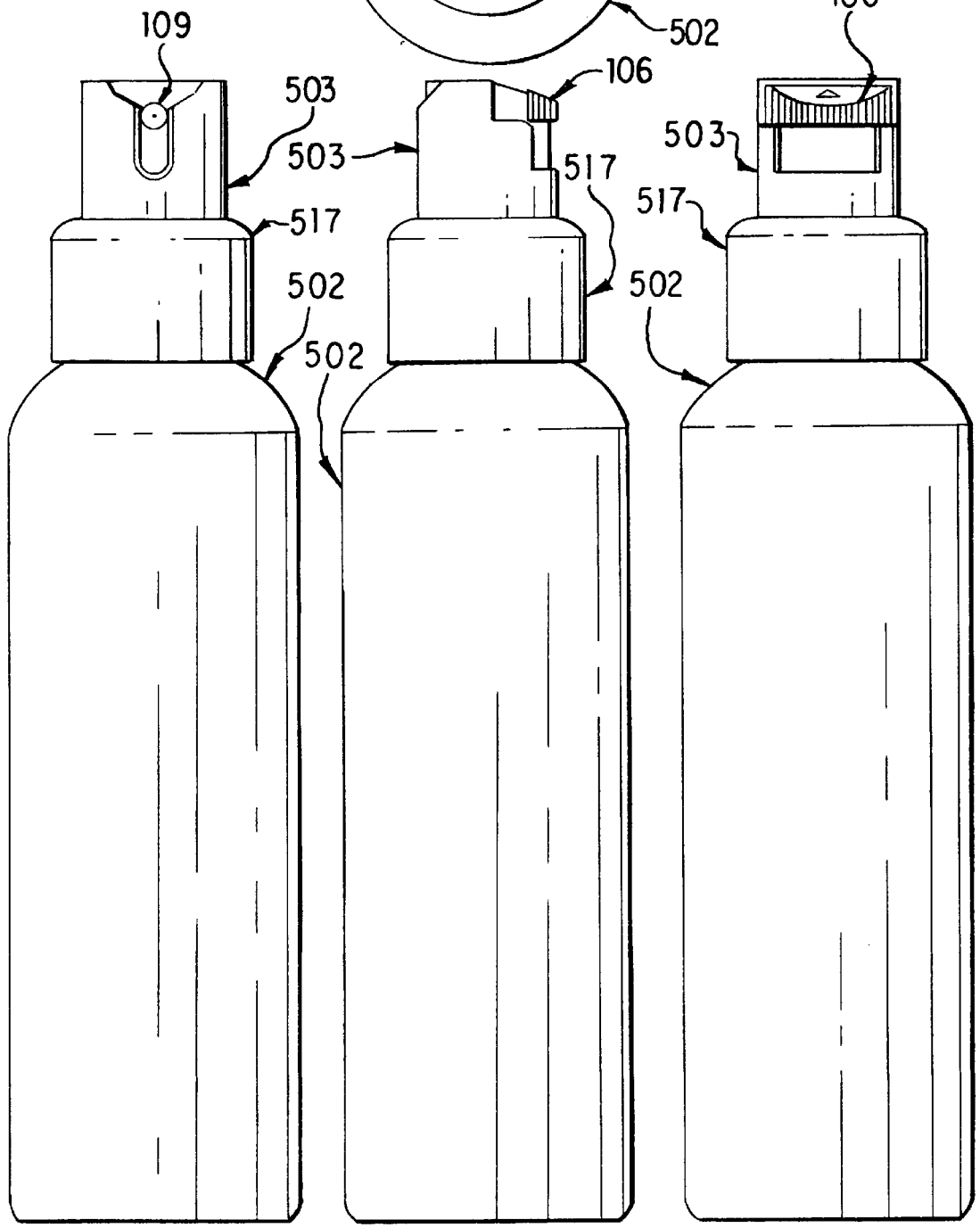
FIGS. 10–13 are, respectively, top, front, side and rear views of the embodiment of FIG. 8.

FIG. 1 shows an embodiment of the present invention in which a dip tube structure 160 is integrally molded with container portion 102. Retaining wall 110 in the embodiment of FIG. 1 is integrally molded with dip tube structure 160 to form a one-piece unit. Dip tube structure 160 includes a venting hole or slot 161, which allows air to escape from container during filling, when filling is accomplished through dip tube structure 160 after bottom portion 117 is secured to container portion 102. The method of filling container 102 through dip tube structure 160 and subsequently assembling pump 12 on container 102 is described in detail in U.S. Pat. No. 5,305,810, the disclosure of which is incorporated herein by reference. The structure of the embodiment of FIGS. 1–3 are described and claimed in U.S. Pat. No. 5,620,113, the substance of which is incorporated herein by reference. The configuration shown in FIG. 1 incorporating an integrally molded dip tube structure 160 is particularly useful for viscous products, for which there may be difficulty in priming the pump, as described in U.S. Pat. No. 5,305,810. The container 101 may be filled through the bottom, after insertion and securement of the pump 112 onto container portion 102. Pump 112 may be secured to container portion 102 either by a conventional snap or interference fit between the exterior of pump 102 and the retaining wall 110 or dip tube structure 160, or by ultrasonic welding using energy directors. Before or after filling, an actuator 106 may be attached to pump 112 stem 140. Actuator 106 may include a nozzle 109. Container portion 102 can include an upstanding wall 103 with an opening 125 which may include a removable tab.

FIGS. 2 and 3 show container portions 102 and bottom portions 117 used in the present invention. The bottom portion 117 in the embodiment of FIGS. 2 and 3 is particularly effective in ensuring a leakproof seal at the bottom of container portion 102. Bottom portion 117 includes an interior piston portion 280, which slides in and seals against an interior sealing surface 282 of container portion 102. Interior sealing surface 282 can be slightly inset from interior surface 287 of container portion 102. Interior piston portion 280 includes a tapered sealing surface 283 extending at an angle φ from vertical. Tapered sealing surface 283 ensures a good leakproof seal of interior piston portion 280 against interior sealing surface 282. Container portion 202 also includes, at its lower end, angled snap rim 284 extending around the entire circumference of container portion 202. Snap rim 284 includes an upper snap surface 285. Bottom portion 117 includes an exterior snap flange 286 which is used to secure and seal bottom portion 117 to container portion 202. Snap flange 286 includes, at its upper end, an angled snap lip 287 extending around the entire circumference of snap flange 286, and a series of snap fingers 288 spaced circumferentially around the interior of snap flange 286. Snap fingers 288 engage with snap surface 285 on snap rim 284 to thereby secure bottom portion 117 to container portion 102. Snap lip 287 generally contacts the exterior of container portion 102 to thereby ensure a good leakproof seal of bottom portion 117 to container portion 202. Bottom portion 117 may include openings 289 to allow proper molding of snap fingers 288 on snap flange 286.

During assembly, bottom portion 117 is slid onto container portion 102 in direction D. As bottom portion slides in direction D, sealing surfaces 282 and 283 engage and seal against one another. As bottom portion 117 moves further in direction D, first snap lip 287 and then snap fingers 288 move around snap rim 284. After snap fingers 288 move around snap rim 284, snap fingers 288 snap into engagement with snap surface 285 to secure bottom portion 117 to container portion 102, and snap lip 287 snaps into engagement with the exterior of container portion 102. As a result, bottom portion 117 is sealed and secured to container portion 102.

FIGS. 4–7 show another embodiment of the present invention. The embodiment of FIGS. 4–7 is especially useful for larger-size bottles or containers, in which the container portion 402 of the package 401 is made by manufacturing techniques other than injection molding, e.g., the container portion 402 is blow-molded. The lower end of package 401 is manufactured and assembled in an identical manner to the embodiment of FIGS. 1–3—i.e., the lower portion of container portion 402 includes a snap rim 284 with a snap surface 285. Similarly, the bottom portion 217 of package 401 is identical to that of FIGS. 1–3—i.e., bottom portion contains a snap flange 286 with snap lip 287 and a series of snap fingers 288, as well as openings 289 corresponding to snap fingers 288, and also includes an interior piston portion 280 with a sealing surface 283 for sealing on sealing surface 281 of container portion 402.

The embodiment of FIGS. 4–7 also includes a mounting cup 417 for mounting a pump 12 to the upper end of container portion 402. Mounting cup 417 includes a retaining wall 410 including a retaining opening 411 used to secure a pump 12 in the mounting cup 417. Pump 12 can be of any conventional design. Pump 12 includes a retention flange 13 for limiting the amount of inward movement of the pump 12 into the retaining opening 411 of the mounting cup 417. Retention flange 13 retains the pump 12 in the mounting cup 417 via a snap-fit engagement with retaining opening 411. Pump 12 is inserted into retaining opening 411 through the upper end of mounting cup 417. Pump 12 or mounting cup 417 can include energy directors for sonically welding pump 12 to mounting cup 417.

The mounting cup 417 in the embodiment of FIGS. 4–7 is particularly effective in ensuring a leakproof and easy-to-assemble mounting of pump 12 onto container portion 402 without the need for complicated molding of container portion 402. Mounting cup 417 includes an interior piston portion 480, which slides in and seals against an interior sealing surface 482 of container portion 402. Interior sealing surface 482 can be slightly inset from interior surface 481 of container portion 402. Interior piston portion 480 includes a tapered sealing surface 483 extending at an angle θ from vertical. Tapered sealing surface 483 ensures a good leakproof seal of interior piston portion 480 against interior sealing surface 482. Container portion 402 also includes, at its upper end, angled snap rim 484 extending around the entire circumference of container portion 402. Snap rim 484 includes a lower snap surface 485. Mounting cup 417 includes an exterior snap flange 486 which is used to secure and seal mounting cup 417 to container portion 402. Snap flange 486 includes, at its upper end, an angled snap lip 487 extending around the entire circumference of snap flange 486, and a series of snap fingers 488 spaced circumferentially around the interior of snap flange 486. Snap fingers 488 engage with snap surface 485 on snap rim 484 to thereby secure mounting cup 417 to container portion 402. Snap lip 487 generally contacts the exterior of container portion 402 to thereby ensure a good leakproof seal of mounting cup 417 to container portion 402. Mounting cup 417 may include openings 489 to allow proper molding of snap fingers 488 on snap flange 486.

The apparatus of FIGS. 4–7 can be assembled and filled in one of two ways. First, the pump 12 can be mounted to mounting cup 417 and then mounting cup 417 mounted to container portion 402. Container portion 402 may then be filled through the bottom, as described above, after which bottom portion 217 may be snapped onto container portion 402. Alternatively, the bottom portion 217 could be snapped to container portion 402 first (or, alternatively, the container portion 402 could be made with an integral bottom), the container portion 402 filled through the top, and then mounting cup 417, with pump 12 and actuator 6 already mounted thereon, could be snapped onto container portion 402.

FIGS. 8–13 show an additional embodiment of the present invention similar to the embodiment of FIGS. 4–7. The embodiment of FIGS. 8–13 is also useful for larger-size bottles or containers, in which the container portion 502 of the package 501 may be made by manufacturing techniques other than injection molding, such as blow-molding.

The embodiment of FIGS. 8–13 also includes a mounting cup 517 for mounting a pump 112 to the upper end of container portion 502. Mounting cup 517 includes a retaining wall 510 including a retaining opening 511 used to secure a pump 112 in the mounting cup 517. Pump 112 can be of any conventional design. Pump 112 includes a retention flange 113 which snaps into a retaining groove between retaining wall 510 and a retaining bead 520 on the interior piston portion 580. Pump 112 is inserted into retaining opening 511 through the lower end of mounting cup 517.

The mounting cup 517 in the embodiment of FIGS. 8–13 is particularly effective in ensuring a leakproof and easy-to-assemble mounting of pump 112 onto container portion 502 without the need for complicated molding of container portion 502. In addition, the design of mounting cup 517 is such that it does not require a gasket between the mounting cup 517 and the container portion 502 or between the pump 112 and the mounting cup 517. Mounting cup 517 includes an interior piston portion 580, which slides in and seals against an interior sealing surface 582 of container portion 502. Interior piston portion 580 may be tapered radially outwardly. Container portion 502 also includes, at its upper end, angled snap rim 584 extending around the entire circumference of container portion 502, and which is axially spaced from the end of the container portion 502 neck. Snap rim 584 includes a lower snap surface 585. Mounting cup 517 includes an exterior snap flange 586 which is used to secure and seal mounting cup 517 to container portion 502.

The interior piston portion 580 provides sufficient sealing between mounting cup 517 and container portion 502 so as to eliminate the need for a gasket between the container portion 502 and mounting cup 517. The tapering of interior piston portion 580, which causes a slight interference fit, allows good sealing contact between the mounting cup 517 and the container portion 502. In addition, the slight interference fit causes the interior piston portion 580 to be squeezed inwardly upon insertion into container portion 502, thereby more securely holding retention flange 113 in the groove between retaining wall 510 and retaining bead 520. Interior piston portion 580 also causes improved sealing upon increase of pressure in the interior of container portion 502, as the result of pressure acting on the interior circumference of interior piston portion 580.

As shown in FIGS. 8–13, an actuator 106 is mounted on pump 112 and surrounded by an upstanding wall 503 on mounting cup 517. Actuator 106 can include a nozzle 109.

Figure 14:
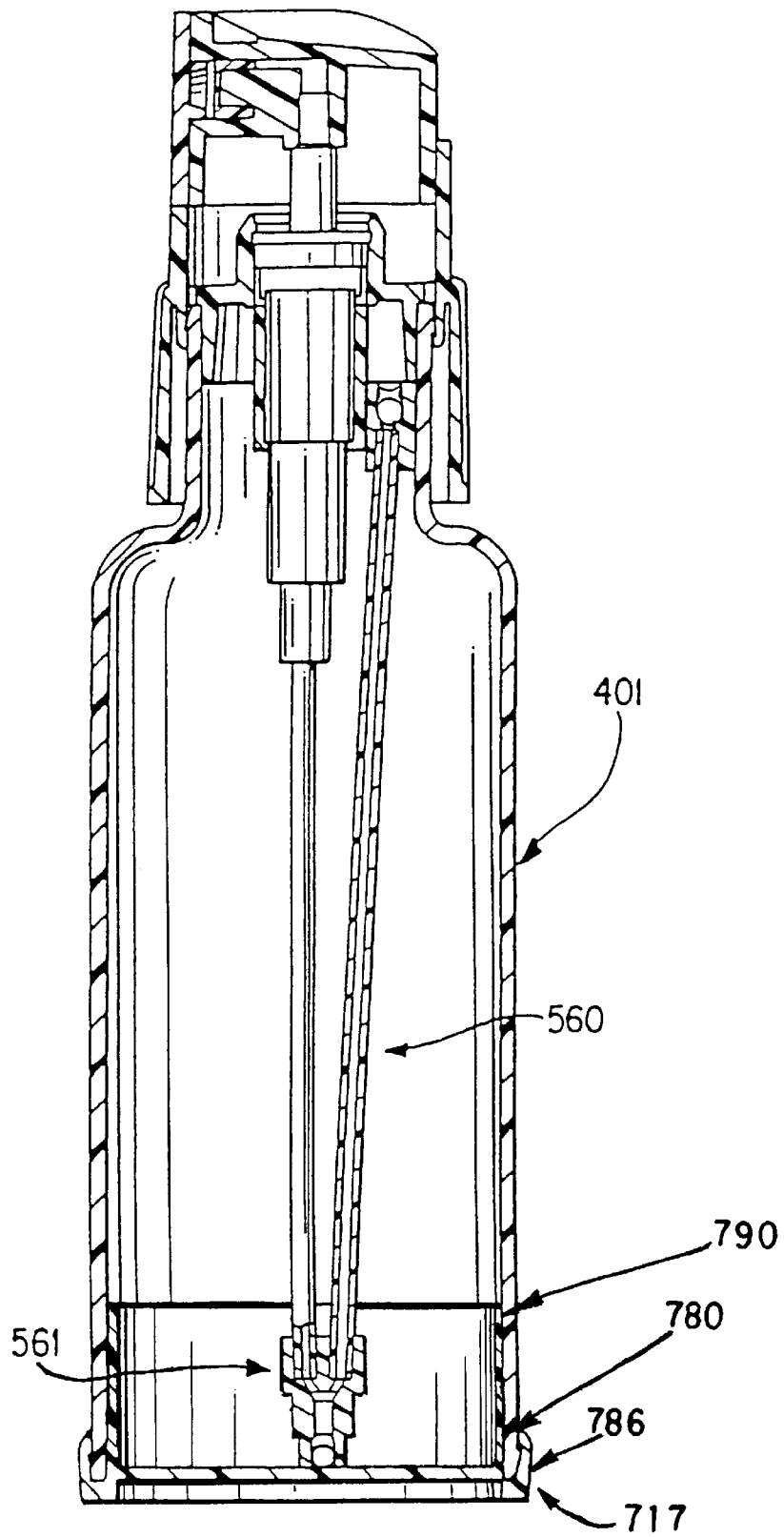
FIG. 14 is a cross-sectional view of the embodiment of FIG. 4, including a first embodiment of a inverted dispensing device of the present invention and a modified bottom closure.
Figure 15:
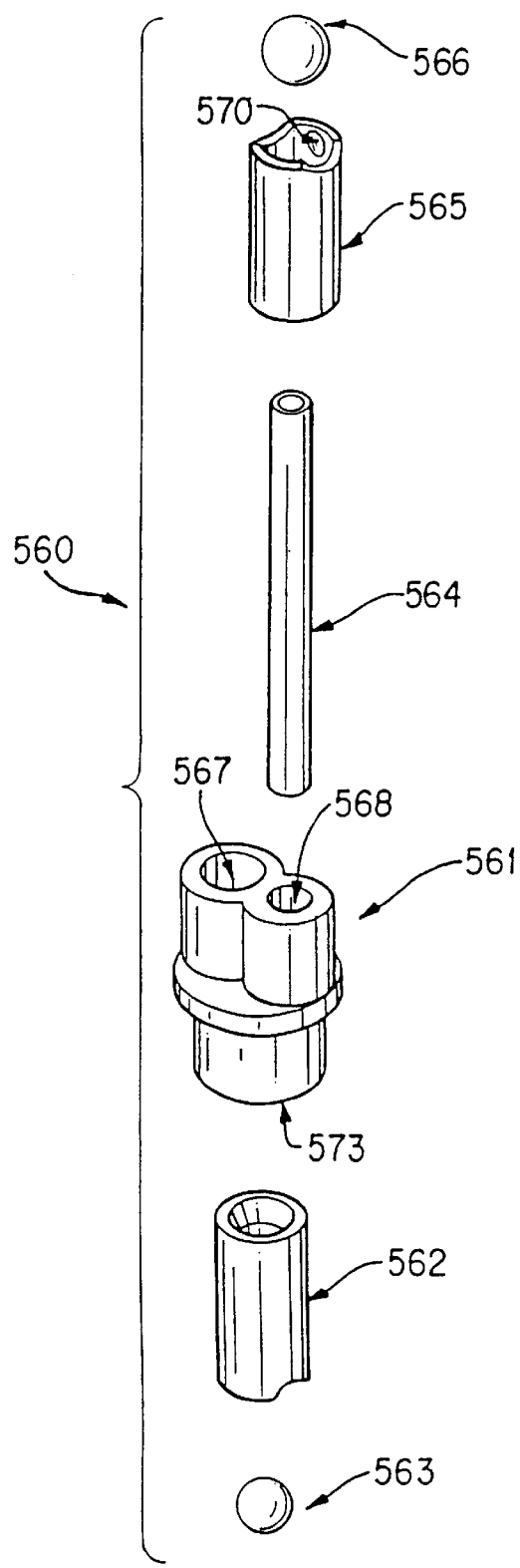
FIG. 15 is an exploded view of the inverted dispensing device of FIG. 14.
Figure 16:
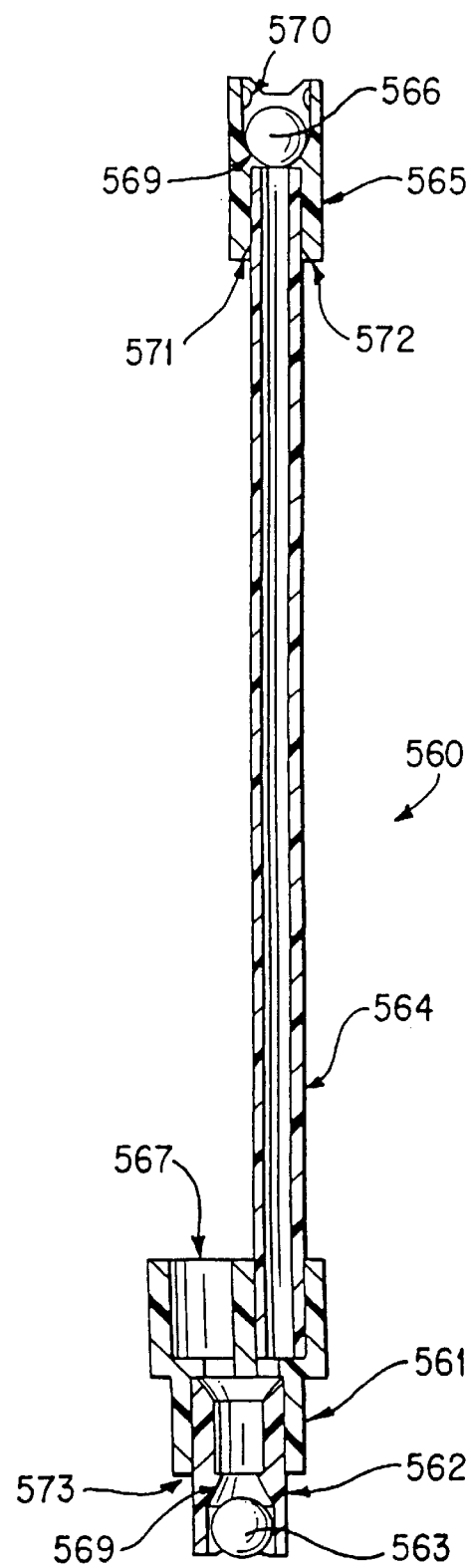
FIG. 16 is an assembled, cross-sectional view of the inverted dispensing device of FIG. 14.

FIG. 14 shows a cross-sectional view of the dispensing package 401 of FIGS. 4–7 with the inclusion of an inverted apparatus 560 to allow inverted dispensing from the dispensing package 401 and a modified bottom closure 717. FIGS. 15–16 show detail views of the inverted apparatus 560 shown in FIG. 14.

The modified bottom closure 717 is designed to reduce the risk of the package leaking. The modified bottom closure 717 is similar to the bottom closures shown in FIGS. 1–4 and 6–7, in that it includes an exterior snap flange 786 and an interior piston portion 780 identical in design to those features as shown in FIGS. 1–4 and 6–7. However, bottom closure 717 also includes an extended interior flange 790 dimensioned to produce an interference fit with the interior surface of dispensing package 401. An internal scratch or groove may be made on the outside surface of extended interior flange 790 in order to allow some air escape during insertion of bottom closure 717 on dispensing package 401. This scratch or groove would not extend onto the interior piston portion 780, which seals the bottom of the dispensing package 401. The extended interior flange 790 helps to more securely attach bottom closure 717.

Figure 17:
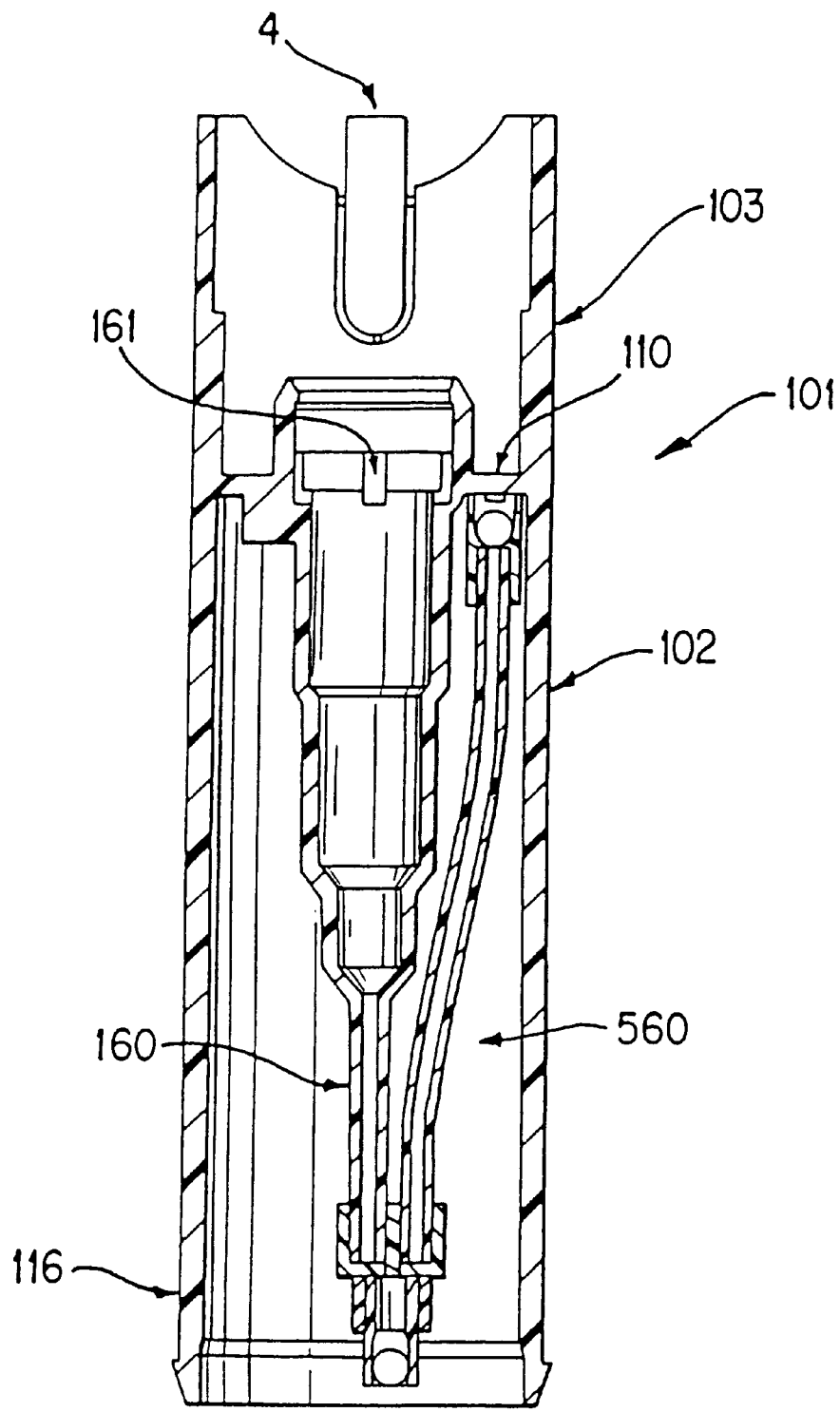
FIG. 17 is a cross-sectional view of the embodiment of FIG. 1 using the inverted dispensing device of FIGS. 14–16.

Inverted apparatus 560 includes a dip tube adapter 561, a lower valve cage 562, a lower valve ball 563, an upper dip tube 564, an upper valve cage 565 and an upper valve ball 566. The first upper opening 567 of dip tube adapter 561 can be sized so as to securely receive a molded dip tube (as shown in FIG. 17), or so as to receive a conventional dip tube (as shown in FIG. 14) which is inserted into a pump. The second upper opening 568 of dip tube adapter 561 is sized so as to securely receive upper dip tube 564, manufactured of a conventional dip tube material. Upper valve cage 565 and lower valve cage 562 are essentially identical in construction; each includes a conical sealing surface 569 upon which balls 563 or 566 may seal, and projections 570 retaining balls 563 or 566 within valve cages 562 and 565, respectively. Upper valve cage 565 is mounted on the end of upper dip tube 564 opposite the end of upper dip tube 564 mounted in second upper opening 568. Upper valve cage 565 includes tapering 571 in outlet opening 572 for assisting in mounting of upper valve cage 565 on upper dip tube 564. Outlet opening 572 is sized so as to securely receive upper dip tube 564. Lower valve cage 562 fits securely in lower opening 573 of dip tube adapter 561.

In operation of the inverted apparatus 560, in an upright position of a dispenser, upper valve ball 566 seals against the conical sealing surface 569 in upper valve cage 565 under the action of gravity, thereby preventing the inlet of air or liquid into upper dip tube 564 and thereby into dip tube adapter 561 and the dip tube of the dispenser. Lower valve ball 563 is retained by projections 570 in lower valve cage 562, which projections allow liquid in the bottom of the dispenser to be drawn into the dip tube, upon a reduction in pressure in the dip tube, around lower ball valve 563. In an inverted position of the dispenser, lower valve ball 563 seals against the conical sealing surface 569 in lower valve cage 562 under the action of gravity, thereby preventing the inlet of air or liquid into dip tube through lower valve cage 562. Upper valve ball 566 is retained by projections 570 in upper valve cage 565, which projections allow liquid in the top of the dispenser to be drawn around lower ball valve 563, into the upper dip tube 564, through dip tube adapter 561 and into the dip tube of the dispenser, upon a reduction in pressure in the dip tube of the dispenser. As a result, the inverted apparatus 560 allows dispensing from the dispenser in both upright and inverted positions. The design of the inverted apparatus 560 is such that it is amenable to mass, high-speed assembly, and is adaptable to any number of dip tube sizes and configurations by merely substituting a different-sized dip tube adapter 561 into the assembly. The inverted apparatus 560 also does not require any modifications to the structure of the dip tube, pump or dispenser, and therefore can be easily adapted to any dispenser or pump size or style.

FIG. 17 shows a view of the dispenser of FIG. 1, which includes an integrally molded dip tube structure 160 cooperating with the inverted apparatus 560.

Figure 18:
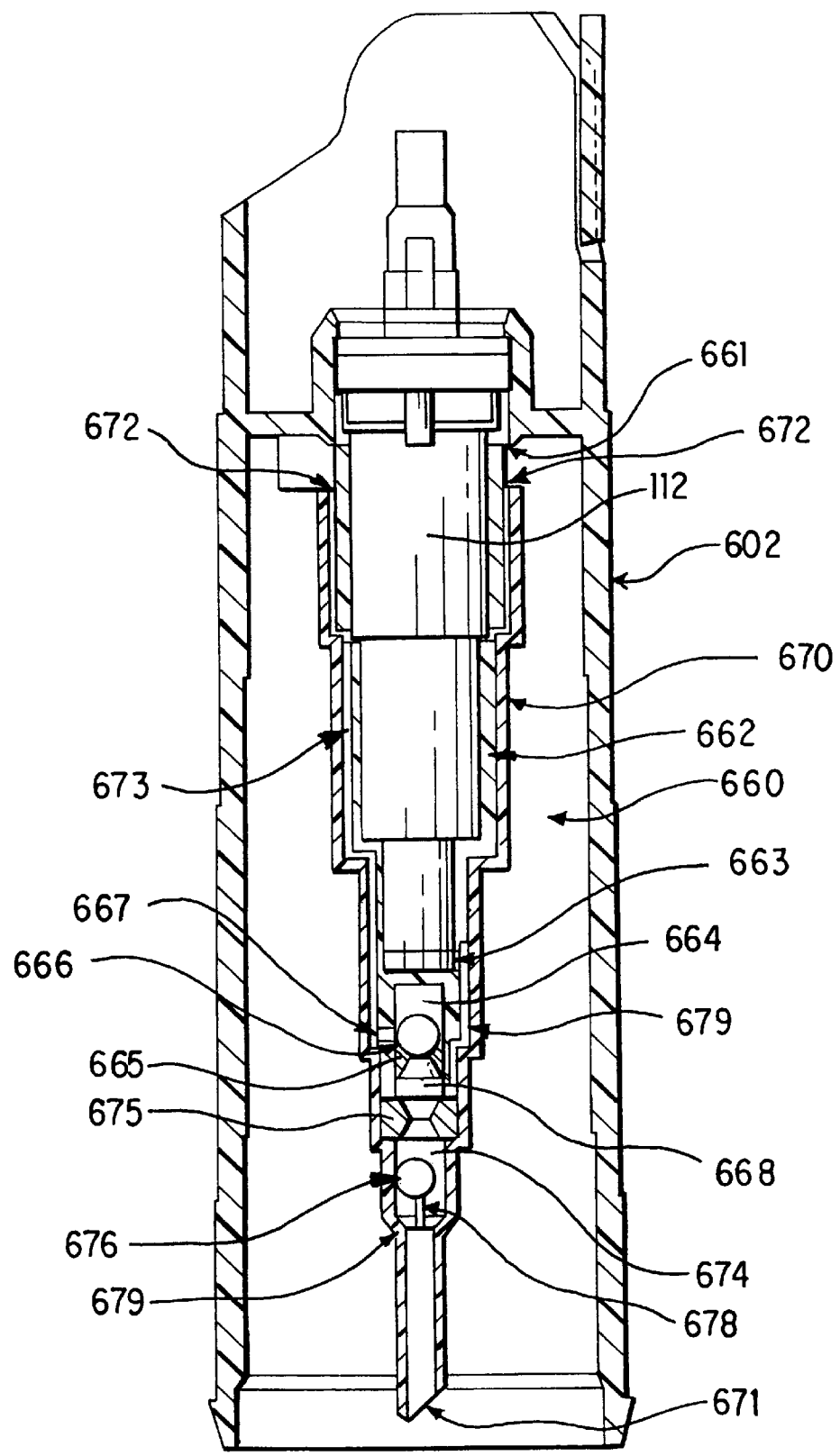
FIG. 18 is a cross-sectional view of a second embodiment of an inverted dispensing device of the present invention.

FIG. 18 shows a inverted apparatus 660 which is adapted to be used with a container portion 602 including an integrally molded partial dip tube 662. Pump 112 is inserted, as with the embodiment of FIG. 1, into the partial dip tube 662, which partial dip tube 662 includes a venting hole or slot 661. A side wall of partial dip tube 662, near the pump 112 inlet, includes an opening 663 which allows liquid to enter the pump 112 inlet. Lower end of partial dip tube 662 includes a inverted valve cage 664 with an inlet opening 667 and an outlet opening 668. An inverted valve ball 666 is held in inverted valve cage 664 by a retaining insert 665 which includes a valve sealing surface.

Mounted on the exterior of partial dip tube 662 is an inverted dispensing adapter 670, which includes an upright inlet 671, an upright valve cage 674, and an inverted inlet 672. Portions of the interior of inverted dispensing adapter 670 are spaced from the exterior of partial dip tube 662, thereby forming a inverted dispensing channel 673. Inverted dispensing channel 673 connects the upper end of container portion 602 to the inlet opening 667. In addition, a portion of the inverted dispensing adapter 670 is spaced from the lower end of partial dip tube 662 to create a feed channel 679 connecting the outlets of valve cages 664, 665 to the opening 663. Upright valve cage 674 contains therein a upright valve ball 676 which is held in upright valve cage 674 by a retaining insert 675, including a valve sealing surface, and a narrowed portion 679 and ribs 678.

Assembly and operation of the device of FIG. 18 will now be described. Ball 666 is inserted into cage 664 and then retained therein by insert 665. Ball 676 is inserted into cage 674 and retained therein by insert 675. Inverted dispensing adapter 670 is then mounted on the partial dip tube 662. Pump 112 may be mounted on container portion 602 either before or after the above steps. The container portion 602 may then be filled from the bottom, and a bottom closure (not shown) similar to those described above may be snapped onto the bottom of container portion 602. During upright dispensing, ball 666 seals against the sealing surface on insert 665, thereby preventing air or liquid from passing from channel 673 to channel 679. Liquid is therefore drawn, when the dispenser is in the upright position, through inlet 671, around ball 676, through valve cage 674 and insert 675, through feed channel 679 and opening 663 and into pump 112. During inverted dispensing, ball 676 seals against the sealing surface on insert 675, thereby preventing air or liquid from passing from inlet 671 to channel 679. Liquid is therefore drawn, when the dispenser is in the inverted position, through inlet 672, channel 673 and inlet 667, around ball 666 (which has dropped away from insert 665), through valve cage 664 and insert 665, out outlet 668, through feed channel 679 and opening 663 and into pump 112.

Figure 19:
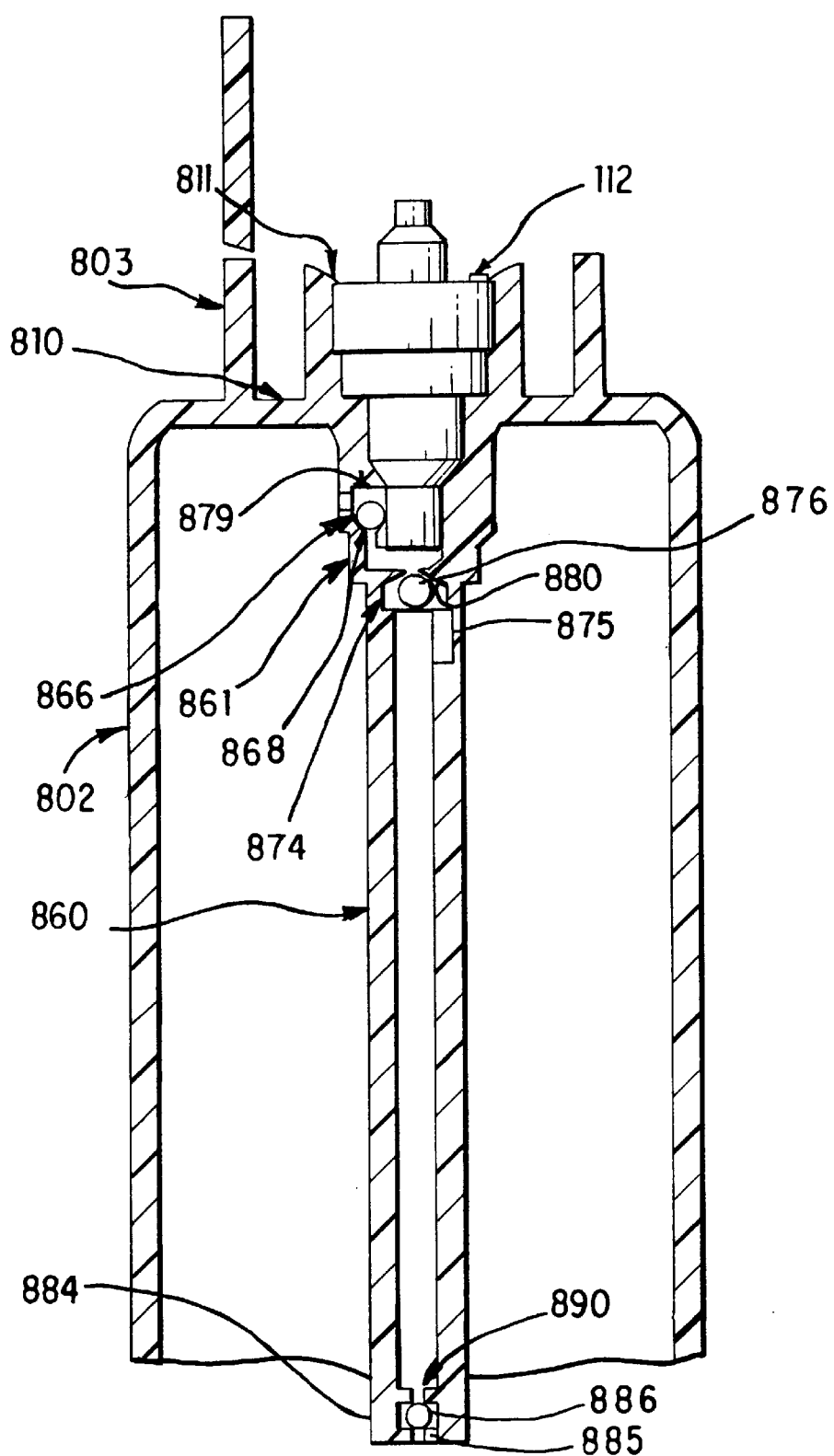
FIG. 19 is a partial cross-sectional view of a third embodiment of an inverted dispensing device of the present invention.

FIG. 19 shows an additional embodiment of an inverted adapter of the present invention. Container portion 802 includes an upstanding wall portion 803 and a retaining wall 810. Pump 112 is snapped into an opening 811 in retaining wall 810. Retaining wall 810 has molded integrally therewith a dip tube structure 860 through which a hole or slot 861 extends. An inverted dispensing valve ball 866 rests on a valve seat 868 and is held between the pump 112 and the dip tube structure 860.

An upright dispensing valve ball 876 is snapped into a cage 874 defined by a series of retaining ribs 875. A second upright dispensing valve ball 886 may be snapped into a cage 884, at the bottom of dip tube structure 860, defined by a series of retaining ribs 885. A channel 879 is created between the pump 112 and the dip tube structure 860.

During upright dispensing, ball 866 seals against the valve seat 868, thereby preventing air or liquid from passing through hole or slot 861, through channel 879 to pump 112. Liquid is therefore drawn, when the dispenser is in the upright position, through dip tube structure 860, around ball 876, through valve cage 874 and into pump 112. During inverted dispensing, ball 876 seals against the sealing surface 880 at the top of dip tube structure 860 and ball 886 seals against the sealing surface 890 at the bottom of dip tube structure 860, thereby preventing air or liquid from passing from the container to the dip tube structure 860 and from dip tube structure 860 to pump 112. Liquid is therefore drawn, when the dispenser is in the inverted position, through hole or slot 861, through channel 879, around ball 866 (which has dropped away from valve seat 868), and into pump 112.

Figure 20:
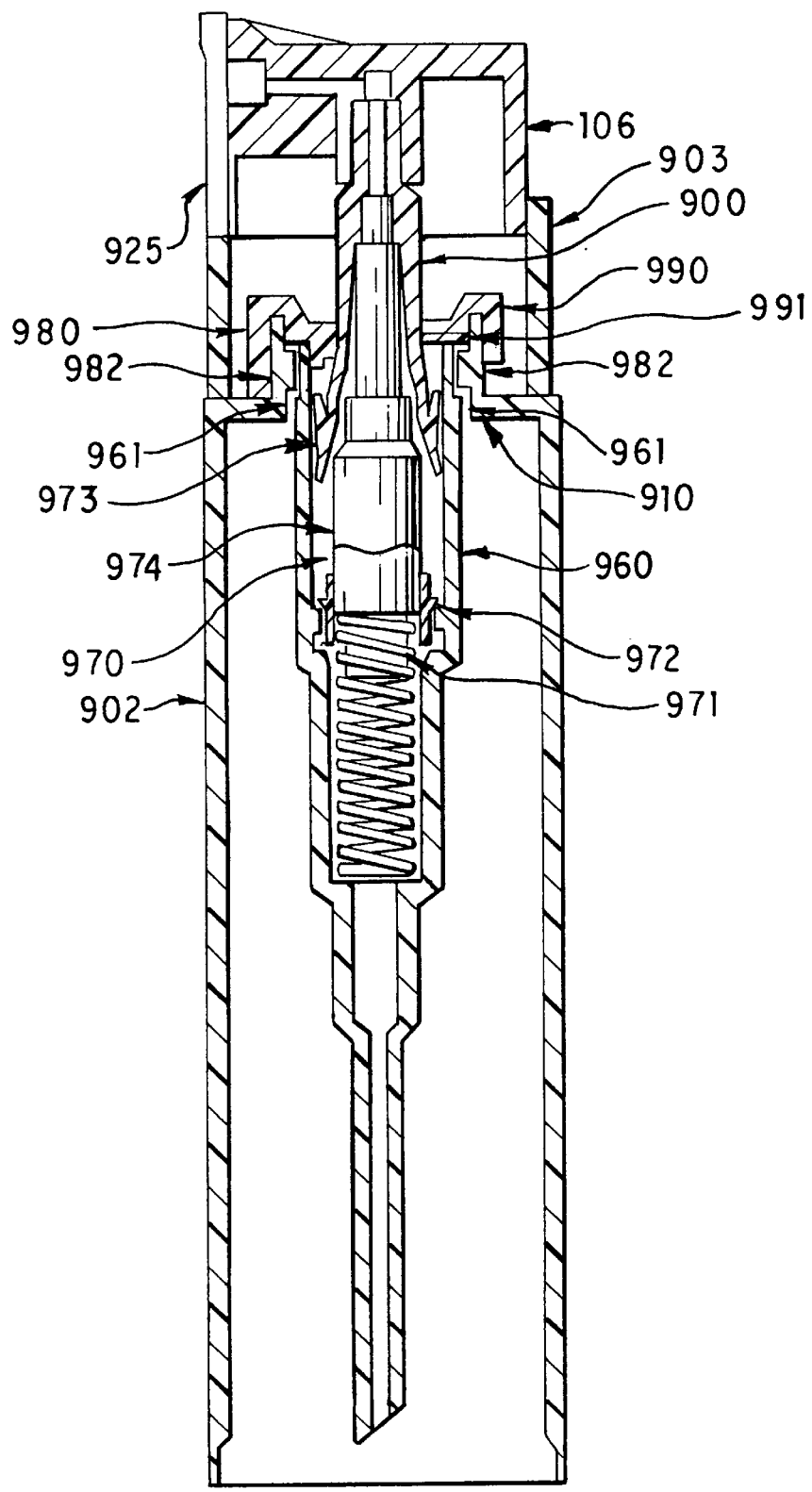
FIG. 20 is a cross-sectional view of fourth (left side) and fifth (right side) embodiments of a dispensing package of the present invention, with a molded-in dip tube structure serving as the pump housing.
Figure 21:
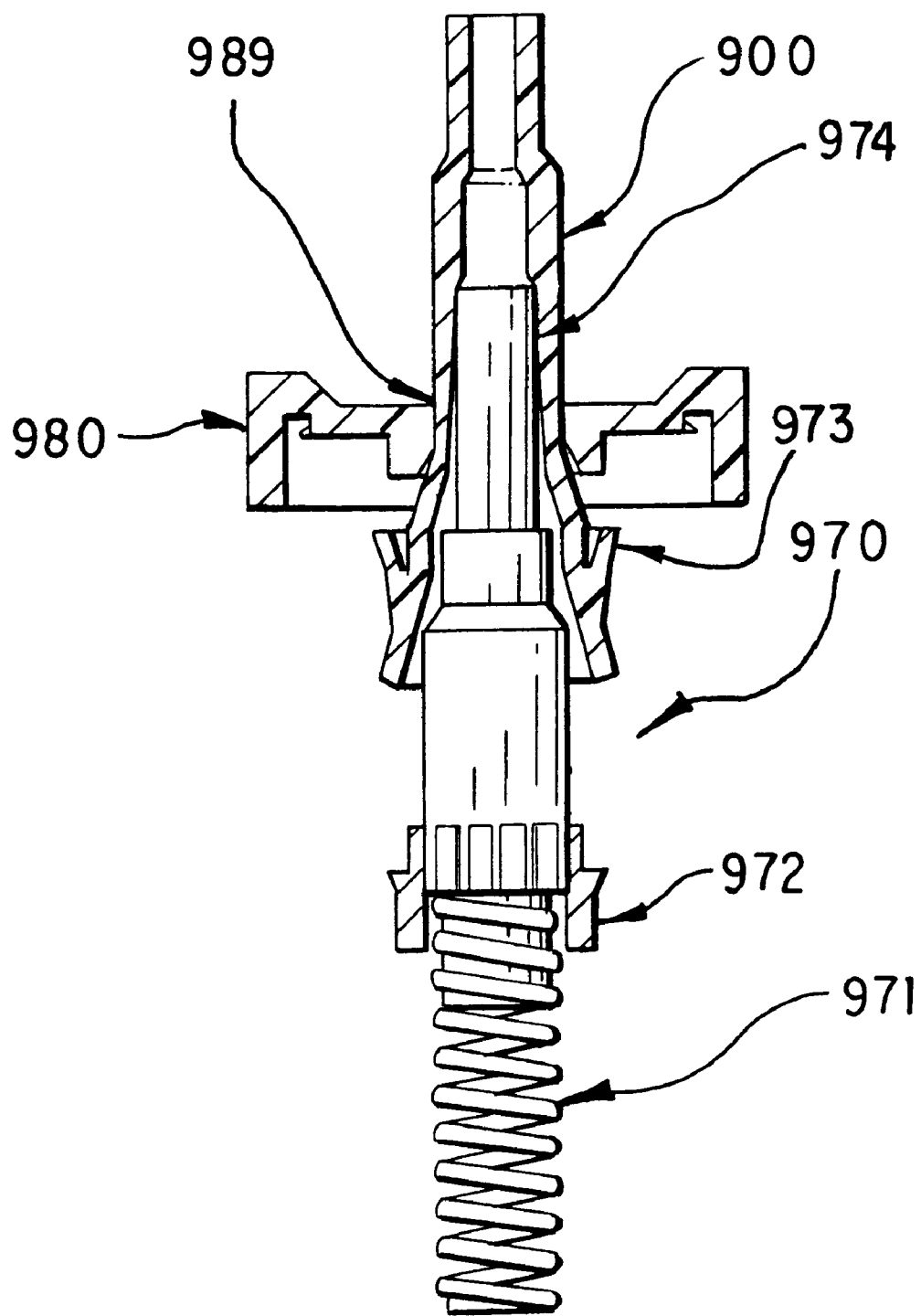
FIG. 21 is a detail, partial cross-sectional view of the pump structure of the embodiment of FIG. 20.

FIGS. 20 and 21 show additional embodiments of the present invention, using an integrally-molded dip tube structure and pump housing. Dip tube-pump housing structure 960 is integrally molded with container portion 902. Retaining wall 910 in the embodiment of FIG. 20 is integrally molded with dip tube-pump housing structure 960 to form a one-piece unit. Dip tube-pump housing structure 960 includes a venting hole or slot 961, which allows air to enter container portion 902 to equalize internal pressure in container portion 902. Before or after filling, an actuator 106 may be attached to pump stem 900. Container portion 902 can include an upstanding wall 903 with an opening 925 which may include a removable tab.

Held within dip tube-pump housing structure 960 are the components of pump 970. Pump 970 can be of the type shown in U.S. Pat. No. 5,277,559 issued Jan. 11, 1994, the substance of which is incorporated by reference. Pump 970 includes a pump spring 971, an sliding inlet seal valve 972, an outlet valve stem 974, and a pump piston 973 connected to pump stem 900. Pump 970 is a prepressure pump, such that the upper portion of outlet valve stem 974 moves away from the pump stem 900 to create an outlet for liquid from the pump 970 only after a sufficiently high pressure has been created in the pump 970.

Two alternative designs are shown for securing the pump components in pump 970 in FIG. 20: on the left side, an all-plastic mounting cap 980 and on the right side, a mounting cap 990 using a rubber or soft plastic seal 991. Mounting cap 980 is snapped directly onto a projection 982 on container part 902, and holds pump 970 components within dip tube-pump housing structure 960 and seals the interior of container part 902 against leakage. Mounting cap 990 also is snapped onto projection 982, but is done so only after insertion of seal 991.

FIG. 21 shows the manner in which the pump 970 components are assembled prior to insertion into dip tube-pump housing structure 960. The spring 971 and sliding inlet seal valve 972 are friction or snap fit onto outlet valve stem 974, and outlet valve stem 974 is friction or snap fit onto piston 973. Mounting cap 980 is snap or friction fit, at point 989, to pump stem 900. These components are then inserted, as a single unit, into the dip tube-pump housing structure 960, generally by automatic assembly equipment. A force is imparted by the automatic assembly equipment, which force snaps mounting cap 980 onto the projection 982, and which force also disengages the fit between mounting cap 980 and pump stem 900 and between outlet valve stem 974 and piston 973, so that these components can thereafter move relative to one another.

Of course, it will be recognized by those skilled in the art that a variety of variations may be made in the construction of the above invention without departing from the claims. As such, the scope of the above invention is be limited only by the claims appended hereto.

What is claimed is:

1. An apparatus for allowing inverted dispensing from a dispensing container comprising a dip tube, the apparatus comprising:

a first valve element, the first valve element comprising first and second inlet openings and an outlet opening, the first valve element further comprising a gravity-biased check valve, the outlet opening of the first valve element receiving a lower end of the dip tube;

a tube, an end of the tube being received in the second inlet opening of the first valve element; and a second valve element, the second valve element comprising an inlet opening, an outlet opening and a gravity-biased check valve, the outlet opening of the second valve element receiving another end of the tube.

2. A package allowing inverted dispensing, the package comprising:

a dip tube structure, the dip tube structure being integrally molded with the package, the dip tube structure being adapted to receive a pump for the dispensing container, the dip tube structure further including a first valve cage, the first valve cage including an inlet and an outlet, the dip tube structure forming an inlet at at least one end of the package;

a first gravity-biased check valve, the first gravity bias check valve being housed in the first valve cage;

a second valve cage;

a second gravity-biased check valve, the second gravity-biased check valve being housed in the second valve cage; and a passage from the second valve cage to an inlet of the pump.

3. The package of claim 2, further comprising:

an insert in the second valve cage.

4. The package of claim 3, wherein:

the insert includes a valve sealing surface.

5. The package of claim 2, further comprising;

an insert in the second valve cage.

6. The package of claim 5, wherein:

the insert includes a valve sealing surface.

7. The package of claim 2, further comprising:

an inverted dispensing adapter, the inverted dispensing adapter being connected to the dip tube structure, the inverted dispensing adapter including an inverted dispensing inlet and an upright dispensing inlet, the inverted dispensing adapter inlet forming a channel between the inverted dispensing inlet and the inlet to the first valve cage, the inverted dispensing adapter further including one of the valve cages.

8. The package of claim 2, wherein:

the dip tube structure forms an inlet at two opposite ends of the package.

9. A package allowing inverted dispensing, the package comprising:

a dip tube structure, the dip tube structure including a first valve cage, the first valve cage including an inlet and an outlet, the dip tube structure forming a dip tube inlet at a first end of the package;

a first gravity-biased check valve, the first gravity bias check valve being housed in the first valve cage;

an inverted dispensing structure, the inverted dispensing structure being connected to the dip tube structure, the inverted dispensing structure including a second valve cage including an inlet and an outlet, the dip tube structure forming a channel between the outlet of the second valve cage and the pump, the inverted dispensing structure forming an inverted dispensing inlet at a second end of the package; and a second gravity-biased check valve, the second gravity-biased check valve being housed in the second valve cage.

10. The package of claim 9, wherein:

the dip tube structure and inverted dispensing structure are separable from one another.

* * * * *